United States Patent
Gunnarsson et al.

(10) Patent No.: US 8,929,804 B2
(45) Date of Patent: Jan. 6, 2015

(54) NODE IN A WIRELESS COMMUNICATION NETWORK ARRANGED TO COMMUNICATE WITH AT LEAST ONE SERVING NODE

(75) Inventors: Fredrik Gunnarsson, Linkoping (SE); Henrik Asplund, Stockholm (SE); Mikael Coldrey, Landvetter (SE); Andreas Nilsson, Gothenburg (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 193 days.

(21) Appl. No.: 13/397,810

(22) Filed: Feb. 16, 2012

(65) Prior Publication Data
US 2013/0102243 A1    Apr. 25, 2013

Related U.S. Application Data

(60) Provisional application No. 61/550,108, filed on Oct. 21, 2011.

(51) Int. Cl.
 H04W 72/00   (2009.01)
 H04W 16/28   (2009.01)
 H04W 84/04   (2009.01)
 H04W 88/04   (2009.01)

(52) U.S. Cl.
 CPC ............ *H04W 16/28* (2013.01); *H04W 84/047* (2013.01); *H04W 88/04* (2013.01)
 USPC ....... 455/11.1; 455/450; 455/451; 455/452.2; 455/436; 455/442; 455/437; 455/438; 455/439; 455/440; 455/441; 455/15; 455/16

(58) Field of Classification Search
 USPC ......... 455/450, 451, 452.2, 436–444, 7, 11.1, 455/15–16
 See application file for complete search history.

(56) References Cited

U.S. PATENT DOCUMENTS

| | | | | |
|---|---|---|---|---|
| 7,903,550 | B2* | 3/2011 | Schmidt et al. | 370/230 |
| 8,204,507 | B2* | 6/2012 | Yu et al. | 455/450 |
| 8,320,358 | B2* | 11/2012 | Wang et al. | 370/349 |
| 8,503,968 | B2* | 8/2013 | Singh et al. | 455/343.1 |
| 8,537,850 | B2* | 9/2013 | Qin et al. | 370/445 |
| 2005/0277443 | A1 | 12/2005 | Ozluturk | |
| 2006/0209772 | A1 | 9/2006 | Fang et al. | |
| 2013/0237158 | A1* | 9/2013 | Moe et al. | 455/67.11 |
| 2013/0265966 | A1* | 10/2013 | Yu et al. | 370/329 |

FOREIGN PATENT DOCUMENTS

| | | |
|---|---|---|
| GB | 2476967 A | 7/2011 |
| WO | 2010105699 A1 | 9/2010 |

OTHER PUBLICATIONS

International Search Report and Written Opinion issued in International application No. PCT/EP2012/052393 on Jun. 28, 2012, 12 pages.

\* cited by examiner

*Primary Examiner* — Bobbak Safaipour
(74) *Attorney, Agent, or Firm* — Rothwell, Figg, Ernst & Manbeck P.C.

(57) ABSTRACT

The present invention relates to a first node in a wireless communication network. The first node is arranged to communicate with at least one serving node and comprises a served antenna arrangement that is adapted to communicate with said serving node by means of at least one electrically adjustable antenna radiation lobe. The first node is arranged to evaluate communication properties for said serving node Furthermore, the first node is arranged to include antenna gain of the served antenna arrangement when performing said evaluation.

21 Claims, 5 Drawing Sheets

NODE IN A WIRELESS COMMUNICATION NETWORK ARRANGED TO COMMUNICATE WITH AT LEAST ONE SERVING NODE

This application claims the benefit of U.S. Provisional Patent Application No. 61/550,108, filed on Oct. 21, 2011. The entirety of said application is incorporated by reference herein.

TECHNICAL FIELD

The present invention relates to a first node in a wireless communication network. The first node is arranged to communicate with at least one serving node and comprises a served antenna arrangement that is adapted to communicate with said serving node by means of at least one electrically adjustable antenna radiation lobe. The first node is arranged to evaluate communication properties for said serving node.

The present invention also relates to a method in a wireless communication network where a first node is used to communicate with at least one serving node. The first node uses a served antenna arrangement to communicate with each serving node by means of at least one electrically adjustable antenna radiation lobe, where the method comprises the step of evaluating communication properties for said serving node.

BACKGROUND

In wireless networks, base stations are providing service to terminals. A base station is serving one or more cells in which services are provided. One guiding principle is that a terminal is served by the cell or cells that corresponds to the most favorable radio conditions. In order to maintain an adequate cell assignment of terminals over time, the cell assignment can be altered, for example based on evaluated communication properties such as radio condition measurements.

Examples of such radio condition measurements include Reference Signal Received Power (RSRP) and Reference Signal Received Quality (RSRQ) in E-UTRAN (Evolved UMTS (Universal Mobile Telecommunications System) Terrestrial Radio Access Network), Received Signal Code Power (RSCP) and Received Signal Code Quality (RSRQ) in UTRAN, Reception Level RXLEV and Reception Quality RXQUAL in GERAN (GSM (Global System for Mobile Communications) EDGE (Enhanced Data rates for GSM Evolution) Radio Access Network), etc. In essence, the terminal measures a known waveform transmitted by the base station, and determines received signal strength and quality of that waveform.

For example, the terminal evaluates communication properties via downlink measurements of signals transmitted by the serving base station as well as other, non-serving, base stations. Examples of such measurements include radio signal strength and radio signal quality. These evaluated communication properties are reported to the currently serving base station, or some other serving radio network node such as a radio network controller or base station controller or similar.

The measurement reporting of the terminal can be configured by a serving radio network node, for example as periodical reports, event-triggered reports or event-triggered periodic reports.

The terminal can be a mobile device used for personal communication. It can also be used for machine type communication. Other examples are repeaters and relays which may act as terminals towards the base stations, while also supporting other terminals. Any kind of terminal communicating with base stations has an antenna arrangement for that purpose. Such antenna arrangement may be fixed or reconfigurable.

WO 2010/105699 describes the use of digital receive beamforming of a repeater/relay antenna beam such that it points towards the RBS and possibly at the same time suppresses incoming interference from other spatial directions.

It is a desire to provide a terminal with an improved functionality regarding assignment of appropriate serving node for the terminal compared with prior art.

The above is also applicable not only for those examples of terminals stated above, but for any two nodes that are communicating.

SUMMARY

It is an object of the present invention to provide a terminal with an improved functionality regarding assignment of appropriate serving node for the terminal compared with prior art.

Said object is obtained by means of a first node in a wireless communication network. The first node is arranged to communicate with at least one serving node and comprises a served antenna arrangement that is adapted to communicate with said serving node by means of at least one electrically adjustable antenna radiation lobe. The first node is arranged to evaluate communication properties for said serving node. Furthermore, the first node is arranged to include antenna gain of the served antenna arrangement when performing said evaluation.

According to an example, the first node is arranged to evaluate communication properties between the first node and a present serving node, and to adjust the antenna radiation lobe accordingly. The first node may be arranged to report said evaluation to the present serving node.

According to another example, the present serving node is arranged to determine whether a candidate node is suitable as a new serving node, and if a change of serving node is about to take place from the present serving node to an approved candidate node.

According to another example, the first node is arranged to control the served antenna arrangement such that at least one antenna radiation lobe at least partly is directed towards a present serving node and/or an evaluated candidate node. The direction of said antenna radiation lobe affects the antenna gain.

According to another example, the antenna arrangement is arranged for beamforming, where said beamforming may include adjustment of lobe width and/or steering of at least one antenna radiation lobe in a desired direction. Said beamforming may alternatively include turning on and turning off fixed antenna radiation lobes which are directed in mutually different direction.

According to another example, the first node is in the form of an intermediate node that is arranged to relay information between a serving node and at least one served node. The serving node is constituted by a present donor node, and the evaluation is performed in order to determine whether a certain candidate node is a suitable donor node. For example, the intermediate node is a repeater or a relay, and the served node may be constituted by at least one user terminal Said object is also obtained by means of a method in a wireless communication network where a first node is used to communicate with at least one serving node. The first node uses a served antenna arrangement to communicate with each serving node by means of at least one electrically adjustable antenna radiation lobe, where the method comprises the steps of evaluating communication properties for said serving node and including antenna gain of the served antenna arrangement when performing said evaluation.

According to an example, the method further comprises the steps of reporting said evaluation to a present serving node; determining whether a change of serving node is about to take place from the present serving node to a new serving node, and determining if a candidate node is suitable as new donor node.

Further examples are disclosed in the dependent claims.

A number of advantages are obtained by means of the present invention.

Such advantages include that it enables a serving node to evaluate beamforming gains that can be obtained with serving cell or cells as well as other cells than the current serving cells. This is possible if the radio channels can be adequately estimated, and that the radio channels change slow enough compared to how quick antennas can be reconfigured. One example is the rather stationary channels that are characteristic for line of sight propagation scenarios common with deployments for nodes, for example intermediate nodes such as repeaters and relays, but also other nodes or terminals with stationary, or slowly changing, propagation conditions.

Thereby it is possible to consider load balancing actions in a wider set of scenarios. Load balancing of nodes, for example intermediate nodes such as relays and repeaters, does not need to be immediate, which means that there is time to let the node evaluate beamforming gains as part of the load balancing procedure.

This also means that it is possible to serve a node, for example an intermediate node such as a relay or a repeater, with the cell providing the best radio conditions, both with respect to the received signal, but also to suppression of interference from other cells. This maintains an adequate spectrum efficiency also during load balancing, which is not normally the case when load balancing without antenna beam gains.

BRIEF DESCRIPTION OF THE DRAWINGS

The present invention will now be described more in detail with reference to the appended drawings, where.

DETAILED DESCRIPTION

In the following, a general first node constituted by a terminal with a reconfigurable antenna arrangement in a wireless network will be discussed.

Figure 1:
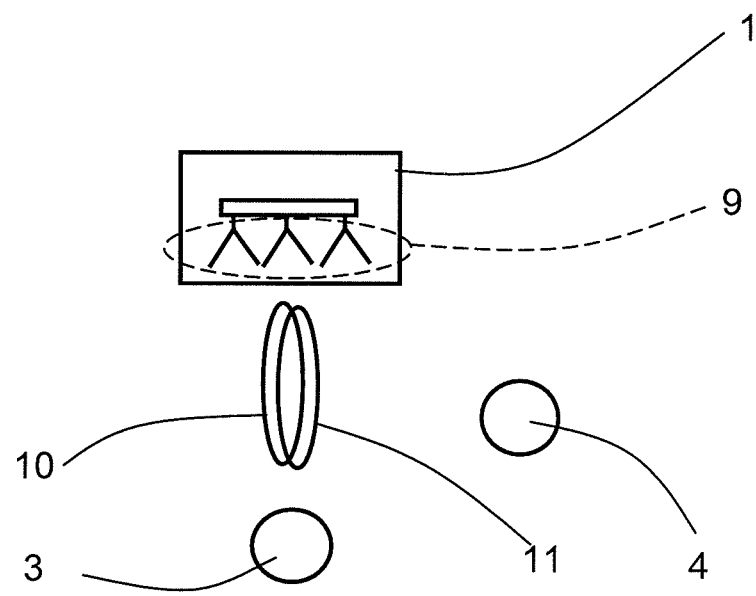
FIG. 1 schematically shows a terminal in a first mode of operation.

With reference to FIG. 1, showing a first example, a terminal 1 is comprised in a wireless communication network 2. The terminal 1 is arranged to receive and transmit information between a serving node 3 and itself. The serving node 3 is providing communication service to users in a serving cell, and may for example be constituted by a base station. If radio conditions are favorable, the terminal 1 can instead be arranged to receive and transmit information between a serving node candidate 4. The serving node candidate 4 is providing communication service to users in a candidate cell.

The terminal 1 comprises a served antenna arrangement 9 that is adapted to communicate with the serving node 3 by means of a first antenna radiation lobe 10 and a second antenna radiation lobe 11, where the antenna radiation lobes 10, 11 are electrically steerable. The served antenna arrangement 9' is for example constituted by a reconfigurable antenna.

The terminal 1 is further arranged to evaluate measured data in the form of communication properties for the serving node 3 and possible serving node candidates 4.

The measured and evaluated data regarding communication properties for both the serving node 3 and possible serving node candidates 4 are forwarded to the serving node 3. Based on this data, and other possible parameters such as load balance, the serving node 3 determines whether the terminal should change serving node from the serving node 3 to a new serving node 4 among said serving node candidates 4.

Figure 2:
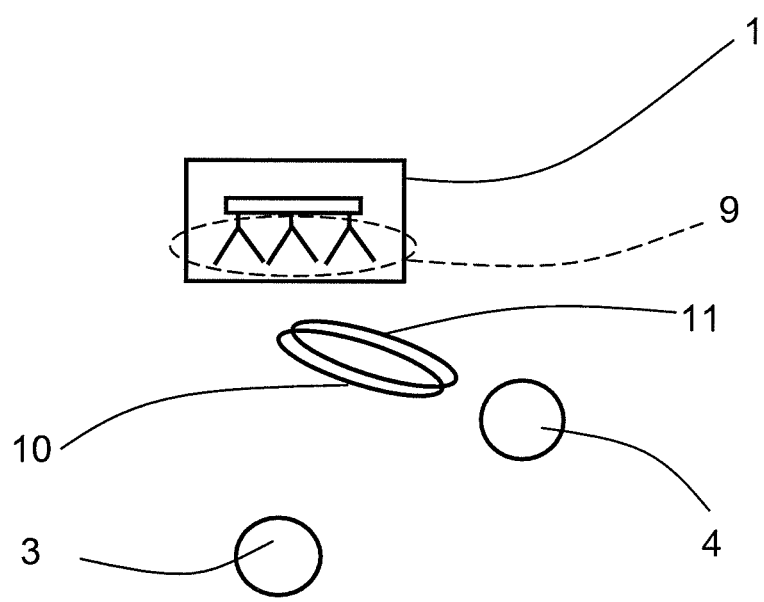
FIG. 2 schematically shows a terminal in a second mode of operation.

If such a change is determined to take place, the terminal 1 is instructed to direct its antenna radiation lobes 10, 11 towards the new serving node 4, such that a so-called hand-over is performed, as shown in FIG. 2.

A hand-over is a procedure of changing serving node. This procedure is well-known in the art and can for example be supported by measurements from the terminal as described above. For example, a handover from the serving node 3 to a new serving node can be initiated when the terminal's reports indicate that a candidate serving node 4 is perceived as more favorable compared to the serving node 3.

Handover can also be performed due to other reasons than pure radio conditions being more favorable, for example a highly loaded serving node such as a base station may hand over the terminal to a base station with less load, provided that the terminal perceives at least acceptable radio conditions after the hand-over.

According to the present invention, the terminal 1 is arranged to include antenna gain of the served antenna arrangement 9' when performing said evaluation. Regarding antenna gain, this term mainly refers to antenna properties resulting from an antenna arrangement configuration, which in this context preferably mainly is as favorable as possible.

In a practical example, this means that the terminal 1 is allowed to inform the serving node 3 about the potential of beamforming considering candidate serving nodes 4.

This means that the terminal 1 is arranged to consider favorable antenna arrangement configurations when evaluating communication properties with respect to the serving node 3 in its serving cell, as well as different non-serving candidate nodes in candidate cells.

This means that the consideration of favorable antenna arrangement configurations could be for the actual measurements, when the measurements are used in evaluations of report triggering conditions, or both.

The serving node 3 configures measurement and reporting mechanisms of the terminal 1. Here, the serving node 3 also indicates which measurements, and possibly also with respect to which cell, that should be performed using a favorable antenna arrangement configuration that improves received serving cell signal power, and/or reduces received interfering cell signal power. Alternative favorable antenna arrangement configurations will be discussed later in the description. Furthermore, the serving node 3 configures the measurement report triggering conditions.

The terminal 1 is arranged to determine a favorable antenna arrangement configuration with respect to different cells. The different cells may be indicated in the measurement and reporting configuration from the serving node 3.

These favorable antenna arrangement configurations are used in the terminal 1 when evaluating the communication properties via radio condition measurements. These radio condition measurements, including the favorable antenna arrangement configuration gains, are then used to evaluate the report triggering conditions, which may be: (i) on demand, which means that the terminal 1 reports when the measurements are completed; (ii) periodic, which means that the terminal 1 reports regularly; (iii) event driven, which means that reports are sent when configured event triggering conditions are met; or (iv) event driven, periodic, which means that periodic reports are initiated when configured event triggering conditions are met.

Periodical reports can be configured as a period and a number of reports to be sent. Event-triggered reporting means that a report is triggered when a configured criterion is met. Such criterions can be based on the measurements themselves. One example is that a report is triggered when a processed measurement, exceeds a configurable threshold over a configurable time window. Another example is that a report is triggered when a processed measurement with respect to a non-serving cell exceeds a processed measurement with respect to the serving cell by a configurable threshold over a configurable time window. In the examples, a processed measurement may mean a filtered measurement. Event-triggered period reporting means that the periodic reporting is initiated when an event has triggered.

The reported radio condition measurements are considered by the serving node 3 when evaluating radio resource management actions. Such actions include (A), (B) as follows: (A) Evaluation of handover candidates. One example is a triggering of handover from a serving cell to a candidate cell when receiving a report from the terminal 1, stating that the radio conditions including favorable antenna arrangement configurations with respect to an evaluated candidate cell are adequate. For example, the reported candidate cell radio conditions can be above a first threshold, or can be at least a second threshold better than the reported serving cell radio conditions. (B) Evaluation of a load balancing action where a terminal 1 is considered to be moved from the serving cell to a candidate cell, possibly even despite the fact that that the radio conditions excluding favorable antenna arrangement configurations is worse with the candidate cell. One example is to base the decision on information about the radio conditions of the candidate cell considering a favorable antenna arrangement configuration in order to evaluate whether the terminal 1 will perceive sufficient radio conditions also after the handover to the candidate cell.

As mentioned initially, the terminal can be any user terminal suitable for personal communication. It can also be suitable for machine type communication or a stationary arrangement such as a WiFi installation. Other examples are repeaters and relays which may act as terminals towards the base stations, while also supporting other terminals.

Repeaters and relays are used in wireless communication systems for range extension and to overcome problems with poor coverage. In its simplest form, the repeater receives, amplifies, and then forwards the radio waves transmitted by a node such as a serving Radio Base Station (RBS) or user terminal (e.g. mobile phone). A more advanced form is a device that receives, decodes, regenerates and forwards signals. This is sometimes referred to a relay.

Repeaters and relays are usually served by a base station called donor base station, and usually serve user terminals. Repeaters and relays have antenna arrangements intended to communicate with the base station and same of different antenna arrangements to communicate with its served terminals.

In the following, an example directed to a repeater or a relay will be described, and the term intermediate node will be used for these or similar devices. This means that the intermediate node constitute a special case of the terminal concerning aspects of how a terminal supports the handover procedure to its serving base station.

Hence, when the notion terminal is used in the description, also intermediate nodes are considered, and when the notion intermediate node is used in the description, then specific aspects of repeaters/relays are addressed.

Figure 3:
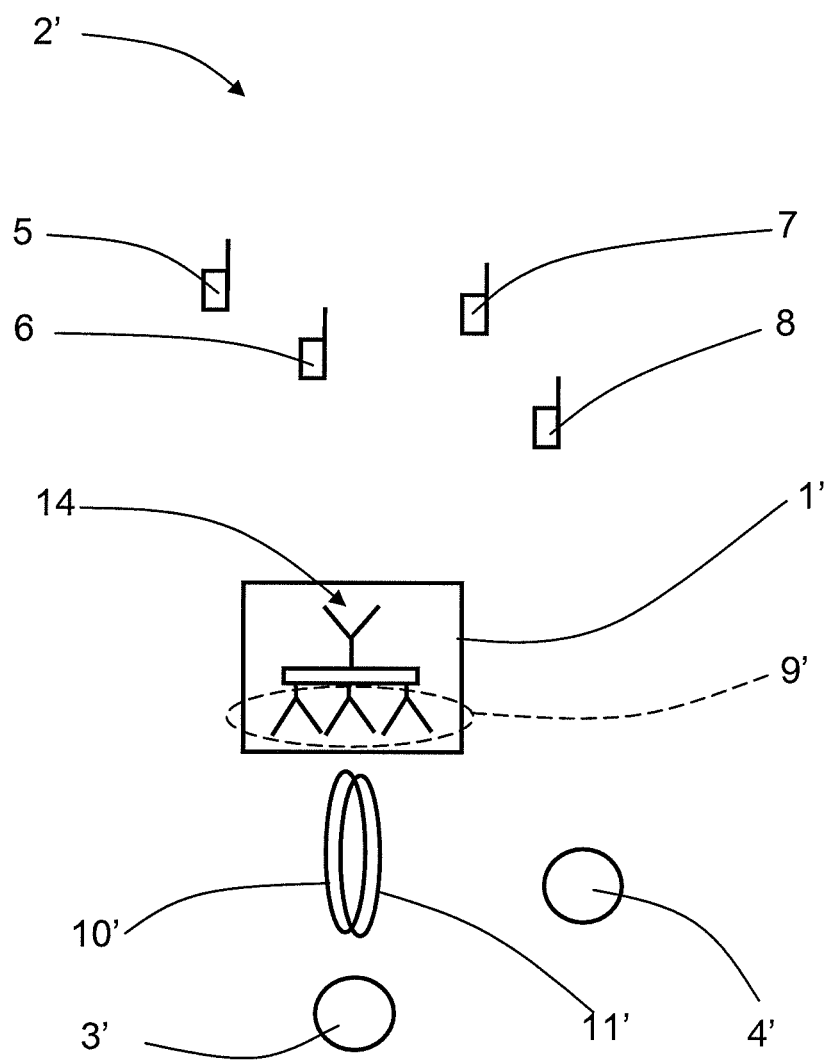
FIG. 3 schematically shows an intermediate node in a first mode of operation.

With reference to FIG. 3, showing a second example, an intermediate node 1' is comprised in a wireless communication network 2'. The intermediate node 1' is arranged to relay information between a first donor node 3' and four served nodes in the form of user terminals 5, 6, 7, 8. The first donor node 3' then functions as a serving node, and is positioned in a serving cell. The first donor node 3' may for example be constituted by a base station.

The intermediate node 1' comprises a served antenna arrangement 9' that is adapted to communicate with the first donor node 3' by means of a first antenna radiation lobe 10' and a second antenna radiation lobe 11', where the antenna radiation lobes 10', 11' are electrically steerable. The served antenna arrangement 9' is for example constituted by a reconfigurable antenna.

The intermediate node further comprises a serving antenna arrangement 14 which is used for communication between the intermediate node 1' and the user terminals 5, 6, 7, 8. The serving antenna arrangement 14' may be of any suitable type, either having one or more fixed and/or steerable antenna radiation lobes.

As described for the terminal in the first example, the intermediate node 1' is arranged to evaluate measured data in the form of communication properties for the first donor node 3' and possible donor node candidates 4, the measured and evaluated data being forwarded to the donor node 3'. Based on this data, and other possible parameters such as load balance, the first donor node 3' determines whether the intermediate node 1' should change donor node from the present first donor node 3' to a new donor node 4' among said donor node candidates 4'.

Figure 4:
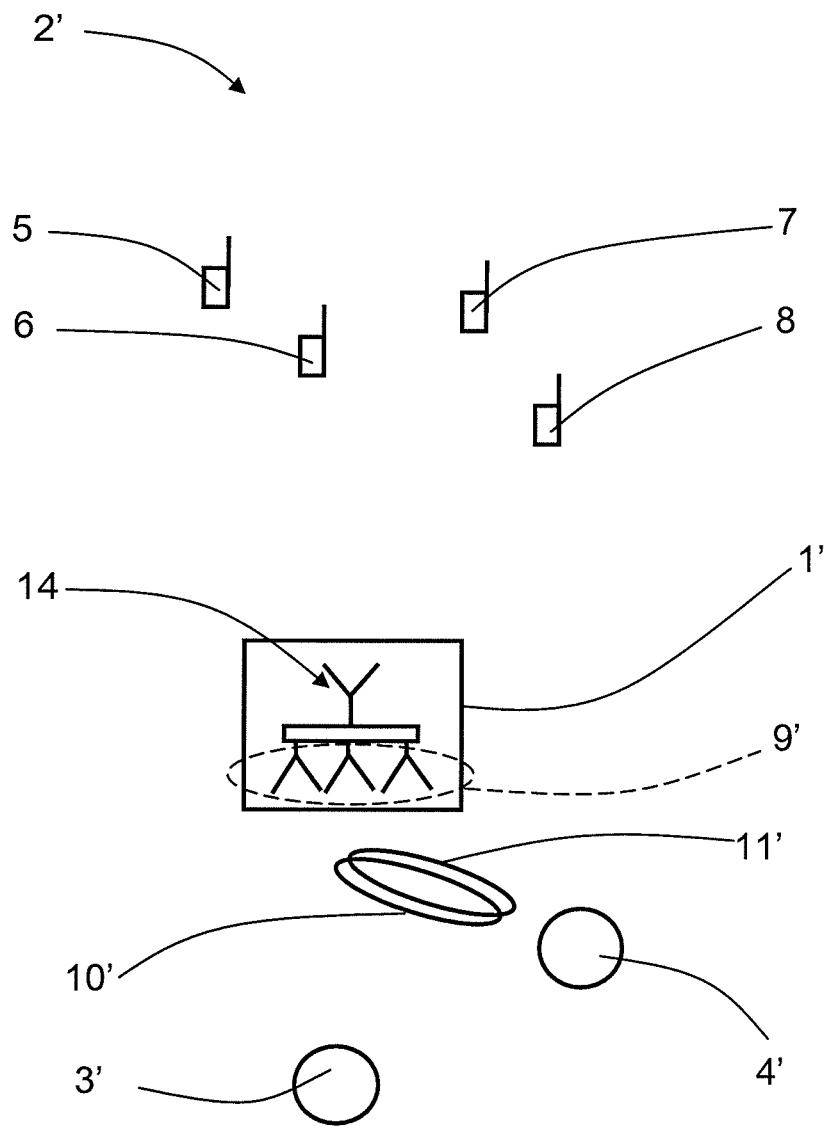
FIG. 4 schematically shows an intermediate node in a second mode of operation.

If such a change is determined to take place, the intermediate node 1' is instructed to direct its antenna radiation lobes 10', 11' towards the new donor node 4', such that a hand-over is performed, as shown in FIG. 4.

Repeaters and relays that are placed on moving objects like for example trains or ships are called mobile relays. A mobile relay must change donor base station due to that the train and ships will move from one cell to another.

If an evaluation of a load balancing action is performed, not only the intermediate node 1' is considered, but also the user terminals 5, 6, 7, 8 served by the intermediate node 1'.

The present invention also relates to cases with less complicated terminals 1, 1'. These may feature less advanced reconfiguration capabilities of the antenna arrangements, and instead feature a number of pre-determined configurations. The serving base station 3, 3' may in such a case configure the terminal 1, 1' measurement and report mechanisms to use the most favorable configuration out of the pre-determined configurations, but also to return information considering one or several, possibly even all, antenna arrangement configurations. The measurements may involve the serving cell as well as candidate cells.

Figure 5:
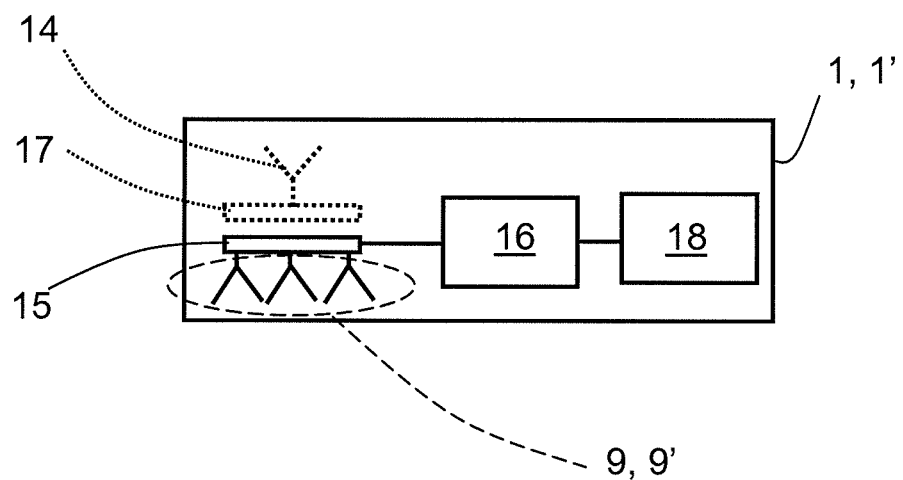
FIG. 5 schematically shows a block diagram of a first node.

With reference to FIG. 5, showing a simplified example a block diagram of a first node such as a terminal, the terminal 1, 1' comprises a first RF (Radio Frequency) transceiver component 15 which is connected to the served antenna arrangement 9, 9', which in itself may comprise one or several antennas. The first RF transceiver component maintains radio connectivity to the serving node. A processor 16 derives suitable antenna processing to realize various antenna arrangement configurations, possibly based on radio measurements of the RF transceiver. The processor 16 also receives measurement configurations from the serving node via the RF transceiver component 15, and the processor 16 configures the served antenna arrangement 9 and the RF transceiver component 15 to perform measurements as indicated by the measurement configuration. The processor 16 triggers and compiles measurement reports that are sent via the RF transceiver component 15 to the serving node. The operations of the processor 16 can be supported by a memory 18.

In the case the terminal is constituted by an intermediate node 1', the intermediate node 1' additionally comprises a second RF transceiver component 17, shown with a dotted line, connected to the serving antenna arrangement 14, also shown with a dotted line. The second RF transceiver component 17 maintains radio connectivity to the served user terminals 5, 6, 7, 8. In FIG. 5, the parts shown with dotted lines are the additional parts that are special for an intermediate node 1'.

In the following, antenna arrangement configurations will be discussed.

One proposed solution relies on classical beamforming in the digital domain which is a known technique and it is briefly described below.

Suppose an antenna array is used as a served antenna arrangement 9, 9' in the form of an array antenna, then the received signal at the terminal 1, 1' can be expressed as $$x(t) = a(\theta_0)s(t) + i(t), \quad t = 1, \ldots, N$$

where $a(\theta)$ is the array response vector, of e.g. a standard uniform linear array, to the signal incident upon the array at the angle $\theta 0$, $s(t)$ is the transmitted signal, and $i(t)$ is a noise and/or interference impairment vector. In order to favor a certain spatial direction in favor of others, the received signal vector is processed by a spatial filter, beamformer, and the output of the spatial filter is given by:

$$y(t) = w^H x(t).$$

There are multiple choices when selecting the beamforming weight vector w. One possibility is to choose the beamformer such that it only maximizes the expected output power from the beamforming filter. That is, $$w_{opt} = \arg\max_{w: w^H w = 1} P_y = \arg\max_w w^H R_x w,$$

where $R_x$ is the covariance matrix of the received signal $x(t)$ and is given by $$R_x = \sigma_s^2 a(\theta_0) a^H(\theta_0) + \sigma_n^2 I,$$

where spatially white noise/interference is assumed. The solution is then given by $$w_{opt} = \frac{a(\theta_0)}{\|a(\theta_0)\|}, \tag{1}$$

i.e., one first needs to locate the peak in the spectrum $$\hat{\theta}_0 = \arg\max_\theta P_y = \arg\max_\theta \frac{a^H(\theta) \hat{R}_x a(\theta)}{\|a(\theta)\|^2}$$

where $\hat{R}_x$ is the sample covariance matrix $$\hat{R}_x = \frac{1}{N} \sum_{t=1}^{N} x(t) x^H(t), \tag{2}$$

and then the resulting beamformer is given by inserting $\hat{\theta}_0$ into equation (1). This kind of beamformer that maximizes the output power is also a matched filter.

In situations with strong interference, for example from neighboring nodes or other repeater/relay stations, a better alternative to the matched filter is the MVDR (Minimum Variance Distortionless Response) or the previously known Capon's beamformer, which attempts to minimize any received interference while keeping a fixed gain in the direction of the signal of interest. The MVDR beamformer is given by solving the following optimization problem $$w_{opt} = \arg\min_w w^H R_x w \text{ s.t. } w^H a(\theta_0) = 1,$$

which has the solution $$w_{opt} = \frac{R_x^{-1} a(\theta_0)}{a^H(\theta_0) R_x^{-1} a(\theta_0)} \tag{3}$$

where $\theta_0$ is the direction of the signal of interest, e.g., the serving node. The beamformer in equation (3) is commonly called an adaptive beamformer since it, compared to equation (1), depends on the received signal $x(t)$ via its covariance matrix, or rather an estimate of its covariance matrix in equation (2). Also note that the denominator in equation (3) is just for normalization purposes and as such does not affect the spatial properties of the beamformer. The direction $\theta_0$ is found by localizing the corresponding peak in the MVDR spectrum $$\hat{\theta}_0 = \arg\max_\theta \frac{1}{a^H(\theta) \hat{R}_x^{-1} a(\theta)},$$

where it is assumed that the maximum peak corresponds to the direction of the signal of interest. One can of course also direct the beam in different directions by simply inserting a different $\theta_0$ into equation (3). The MVDR beamformer has the advantage that it reduces the spatial interference from other directions by placing spatial nulls in the directions of these interferers. Since the MVDR beamformer depends on the inverted sample covariance matrix, it is required that the number of snapshots N in equation (2) is much larger than the number of antenna elements. In some cases regularization, e.g., diagonal loading, of the sample covariance matrix might also be needed to make the calculation of the MVDR beamformer more robust.

In the following, an advanced terminal 1, 1' with channel and interference knowledge will be discussed.

Observe that the MVDR beamforming weights in equation (3) only depend on the second order statistics of the received signal, and not on any known reference signals. Thus, there is no need for using reference signals such as pilots to retrieve the beamforming weights. However, if the intermediate node is advanced enough to estimate the wireless channel and its interference from reference signals embedded in a control channel, it may use the channel and interference estimates to construct a beamformer that maximizes e.g. the SINR (Signal to Interference plus Noise Ratio).

Assume that the channel of the signal of interest has been estimated by using a reference signal, and that it is given by:

$$h = \hat{a}(\theta_0).$$

Further assume that the covariance matrix of the interference also has been estimated in the presence of a known reference signal $S_r(t)$ by using e.g.

$$\hat{R}_i = \frac{1}{N} \sum_{t=1}^{N} (x(t) - h(\theta_0)s_r(t))(x(t) - h(\theta_0)s_r(t))^H,$$

or simply by only detecting the interference in the absence of a signal of interest, e.g. when the supporting RBS is quiet:

$$\hat{R}_i = \frac{1}{N} \sum_{t=1}^{N} i(t)i(t)^H.$$

The SINR maximization problem is given by $$\max_w \frac{w^H R_s w}{w^H R_i w} \text{ where } R_s = \sigma_s^2 h h^H, \quad (4)$$

which is equivalent to minimizing the interference plus noise power, while keeping a fixed gain to the signal of interest, i.e., $$w_{opt} = \underset{w}{\arg\min} \, w^H R_i w \text{ s.t. } w^H h = 1,$$

which has the solution below, given by replacing the covariance matrix in equation (3) by the interference plus noise covariance matrix:

$$w_{opt} = \frac{R_i^{-1} h}{h^H R_i^{-1} h}. \quad (5)$$

The beamformer in equation (5) is based on channel and interference knowledge that has been attained from reference signaling which thus makes the terminal 1, 1' more advanced since it has to be able to perform channel and interference estimation. However, it is therefore more likely to perform better than a less advanced intermediate node that only exploits signal statistics. Also note that it is very similar to the MVDR beamformer in equation (3), and in the following it will be referred to as a modified MVDR beamformer.

In the following, an advanced terminal 1, 1' with multi stream receive beamforming will be discussed.

If the received signal is constituted of multiple streams, i.e. if there is an ongoing MIMO (Multiple Input Multiple Output) transmission between a donor node and a user terminal, it is desired that an intermediate node can forward these multiple streams while maintaining some receive interference rejection. The intermediate node would then apply individual beamformers to each data stream, where these individual beamformers may attempt to reduce spatial interference from interfering nodes and inter stream interference; interference that one stream yields to another.

Assume that the MIMO channel matrix is available, then the intermediate node may apply the following Linear Minimum Mean Square Error (LMMSE) receive filtering matrix to the received signal vector:

$$y = W^H x$$

The beamforming matrix is given by $$W = (HH^H + R_i)^{-1} H \quad (6)$$

where H is the MIMO channel matrix, and $R_i$ is the interference plus noise covariance matrix. The LMMSE beamforming matrix will, in a minimum mean square sense, use the multiple receive antennas to try to undo the mixing of the multiple streams that the channel has introduced, and at the same time suppress any other spatial interference. Moreover, if the channel matrix is rank one, say H=h, then the LMMSE beamformer in equation (6) can be rewritten using the known Woodbury's identity as $$w_{LMMSE} = \eta w, \quad (7)$$

where $w_{LMMSE}$ is the rank one beamformer given by equation (7), $\eta$ is a positive real-valued scalar, and w is the modified MVDR beamformer given by equation (5). Thus in the rank one (single stream) case, the LMMSE and modified MVDR beamformers are just scaled versions of each other.

Regarding array geometries for the served antenna arrangement 9, 9', one-dimensional digital beamformers can also be extended to multidimensional arrays, e.g. planar arrays. By using planar arrays, beamforming can be achieved also in the elevation domain, by for example using extensions of the conventional beamforming technique described above or the MVDR beamformer. The corresponding spectra are then 2-dimensional, in azimuth and elevation.

If the served antenna arrangement 9, 9' comprises dual polarized antennas, then two beamformers would be applied; in principle one individual beamformer for each polarization. The individual beamformers may be found according to the single polarized methods described in this invention.

A less advanced alternative to a fully adaptive beamforming solution that adaptively adjusts itself to time variant interference, like the MVDR beamformer, is to use a set of fixed beams where each beam is designed such that they support different cells, or intermediate nodes in multi-hop solutions, by having strong antenna radiation lobes in directions of these fixed sources, while at the same time having nulls in the directions of fixed interferers.

The terminal 1, 1' can then choose the appropriate beam among this set of fixed beams. Preferably, the set of fixed beams is tailored to specific site installations where the beams can be designed to support and suppress signals and interference from fixed sources, e.g., from base stations or similar nodes, other intermediate node sites, or the actual terminal's self-interference. In fact, one can use the adaptive MVDR beamformer outlined above when designing the set of fixed beams by pointing the main beam in different desired directions and using the remaining degrees of freedom to suppress static interference. This can be done during the terminal's installation process. The set of fixed beams may also be pre-determined to realize different combinations of spatial gain and spatial interference suppression, and the terminal 1, 1' evaluates each of the pre-determined configurations to disclose the most favorable one.

In the outlined beamforming solutions it is assumed that the signal model is narrow-banded. For wideband signals one choice is to implement individual beamformers for different frequency sub bands, e.g. individual or collection of adjacent sub carriers in an OFDM (Orthogonal Frequency Division Multiplexing) system. Since the bandwidth usually is very small compared to the carrier frequency, e.g. 20 MHz versus 2.6 GHz in LTE systems, there is an insignificant error in applying a narrowband beamformer to wideband signals.

Thus, for these bandwidths and carrier frequencies, the narrow-band assumption holds well. However, it is noted that if it is desired to forward only certain frequency sub bands and/or if it is desired to apply different beamformers to different frequency sub bands, then frequency dependent beamformers are needed. This is typically done on individual or groups of adjacent sub carrier level.

Figure 6:
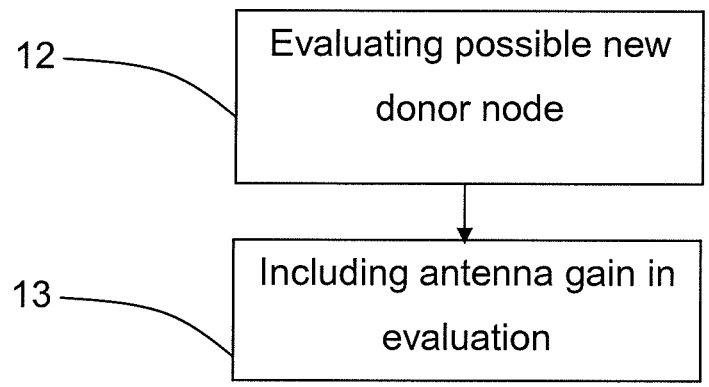
FIG. 6 schematically shows a flow chart of a method according to the present invention.

With reference to FIG. 6, the present invention also relates to a method in a wireless communication network 2, 2' where a first node such as a terminal 1, 1' is used to communicate with at least one serving node 3, 3'. The first node 1, 1' uses a served antenna arrangement 9, 9' to communicate with each serving node 3, 4; 3', 4' by means of at least one electrically adjustable antenna radiation lobe 10, 11; 10', 11'. The method comprises the steps of: (12) evaluating communication properties for said serving node 3, 4; 3', 4'; and (13) including antenna gain of the served antenna arrangement 9, 9' when performing said evaluation.

The present invention is not limited to the examples above, but may vary freely within the scope of the appended claims. For example, the terminal 1, 1' may be arranged to control the served antenna arrangement 9, 9' such that undesired interference is suppressed, where the suppression of interference affects the favorable antenna arrangement configuration gain.

As discussed above, the served antenna arrangement 9, 9' may be arranged for beamforming. Said beamforming may include adjustment of lobe width and/or steering of a suitable number of antenna radiation lobes 10, 11; 10', 11', but at least one antenna radiation lobe 10, 11; 10', 11', in a desired direction.

Said beamforming may also include turning on and turning off at least two fixed antenna radiation lobes which are directed in mutually different direction.

The number of antenna radiation lobes at the antenna arrangement 9, 9' may vary, but there are at least two antenna radiation lobes 10, 11; 10', 11'.

The terminal 1, 1' may further be arranged to control the antenna arrangement 9, 9' such that at least one antenna radiation lobe 10, 11; 10', 11' at least partly is directed towards a present serving node 3, 3' and/or an evaluated candidate node 4, 4', where the direction of said antenna radiation lobe 10, 11, 10', 11' affects the favorable antenna arrangement configuration gain.

To facilitate handover, when at least two antenna radiation lobes 10, 11, 10', 11' are used, at least one antenna radiation lobe 10, 10' may be directed towards the candidate node 4 while at least one other antenna radiation lobe 11, 11' remains directed towards the serving node 3, 3'. When handover procedures are completed, all antenna radiation lobes are directed towards the new serving node 4, 4'. Possibly, each antenna lobe 10, 10' directed towards the candidate node 4, 4' during handover is associated with a first polarization and each antenna lobe 11, 11' directed towards the serving node 3, 3' during handover is associated with a second polarization, the polarizations being mutually orthogonal.

Generally, the present invention is applicable for any two nodes that are communicating. Therefore, generally, the terminal 1, 1' is constituted by a first node and the base stations and donor nodes are constituted by serving nodes. The first node 1, 1' is arranged to communicate with at least one serving node 3, 4; 3', 4'; the present serving node 3, 3' as well as future possible serving nodes 4, 4', so-called candidate serving nodes or target serving nodes.

The first node 1, 1' is arranged to evaluate communication properties for said serving node or serving nodes 3, 4; 3',4', where, according to the present invention, the first node 1, 1' is arranged to include antenna gain of the antenna arrangement 9, 9' when performing said evaluation.

The first node 1, 1' may be arranged to adjust the antenna radiation lobes 10, 11; 10', 11' accordingly, and may also be arranged to report said evaluation to the present serving node 3, 3'.

The present serving node 3, 3' is arranged to determine whether a candidate serving node 4, 4' is suitable as a new serving node, and if a change of serving node is about to take place from the present serving node 3, 3' to an approved candidate serving node 4, 4'.

The invention claimed is:

1. A first node in a wireless communication network, the first node being arranged to communicate with at least one serving node, the first node comprising an antenna arrangement that is adapted to communicate with said serving node by at least one electrically adjustable antenna radiation lobe, wherein the first node is arranged to perform a procedure for changing from the serving node to a candidate serving node comprising performing a radio condition measurement for said serving node and reporting said radio condition measurement to the serving node, wherein the radio condition measurement is based on antenna gain of the antenna arrangement when the antenna arrangement is communicating with the serving node with the at least one electrically adjustable antenna radiation lobe.

2. The first node according to claim 1, wherein the first node is arranged to: (i) evaluate communication properties between the first node and a present serving node and (ii) adjust the antenna radiation lobe accordingly.

3. The first node according to claim 1, wherein the first node is arranged to report said radio condition measurement in response to determining that a measurement has exceeded a threshold.

4. The first node according to claim 1, wherein a present serving node is arranged to determine whether a candidate serving node is suitable as a new serving node and if a change of serving node is about to take place from the present serving node to the candidate node.

5. The first node according to claim 2, wherein a present serving node is arranged to control the first node regarding the evaluation and reporting of the evaluation.

6. The first node according to claim 1, wherein the first node is arranged to control the antenna arrangement such that undesired interference is suppressed, wherein the suppression of interference affects the antenna gain.

7. The first node according to claim 1, wherein the first node is arranged to control the antenna arrangement such that at least one antenna radiation lobe at least partly is directed towards a present serving node and/or an evaluated candidate node, and wherein the direction of said antenna radiation lobe affects the antenna gain.

8. The first node according to claim 1, wherein the antenna arrangement is arranged for beamforming.

9. The first node according to claim 8, wherein said beamforming includes adjustment of lobe width and/or steering of at least one antenna radiation lobe in a desired direction.

10. The first node according to claim 8, wherein said beamforming includes turning on and turning off fixed antenna radiation lobes which are directed in mutually different direction.

11. The first node according to claim 1, wherein the communication is in the form of MIMO, Multiple Input Multiple Output, where beamforming is applied individually for each MIMO data stream.

12. The first node according to claim 1, wherein the antenna arrangement comprises dual polarized antenna elements, where beamforming is applied individually for each polarization.

13. The first node according to claim 1, wherein the first node is in the form of an intermediate node that is arranged to relay information between a serving node and at least one served node, where the serving node is constituted by a present donor node, and where the radio condition measurement is performed in order to determine whether a certain candidate node is a suitable donor node.

14. The first node according to claim 13, wherein the intermediate node is a repeater or a relay.

15. The first node according to claim 13, wherein said served node is constituted by at least one user terminal.

16. A method in a wireless communication network where a first node is used to communicate with at least one serving node, the first node using an antenna arrangement to communicate with the at least one serving node by at least one electrically adjustable antenna radiation lobe, the method comprising: performing a handover procedure that comprises performing a radio condition measurement for said serving node and reporting said radio condition measurement to the serving node,
wherein the radio condition measurement is based on antenna gain of the antenna arrangement when the antenna arrangement is communicating with the serving node with the at least one electrically adjustable antenna radiation lobe.

17. The method according to claim 16, further comprising: determining whether a change of serving node is about to take place from a present serving node to a new serving node, and determining if a candidate node is suitable as a new donor node.

18. The method according to claim 16, wherein the first node is in the form of an intermediate node that is used to relay information between a serving node and at least one served node, where this serving node is constituted by a present donor node, and where the radio condition measurement is used for determining whether a candidate node is a suitable donor node.

19. The method according to claim 16, wherein the served antenna arrangement uses beamforming to perform at least one of: adjusting lobe width; steering at least one antenna radiation lobe in a desired direction; and turning on and turning off fixed antenna radiation lobes which are directed in mutually different direction.

20. The first node of claim 1, wherein the radio condition measurement is at least one of: a reference signal received power (RSRP), reference signal received quality (RSRQ), received signal code power (RSCP), received signal code quality (RSCQ), reception level (RSLEV), and reception quality (RXQUAL).

21. A base station in a serving cell of a wireless communication network, comprising a processor configured to:
broadcast a reference signal in the serving cell;
receive, from a node in the serving cell, a first measurement of the reference signal in the serving cell that is based on a beamforming operation applied to the reference signal by the node;
receive, from the node, a second measurement of a reference signal broadcasted in a candidate cell, wherein the second measurement is based on a beamforming operation applied to the candidate cell's reference signal by the node; and
evaluate, based on the first and second measurements, whether to trigger a handover for the node from the serving cell to the candidate cell.

* * * * *

UNITED STATES PATENT AND TRADEMARK OFFICE
CERTIFICATE OF CORRECTION

Page 1 of 1

PATENT NO. : 8,929,804 B2
APPLICATION NO. : 13/397810
DATED : January 6, 2015
INVENTOR(S) : Gunnarsson et al.

It is certified that error appears in the above-identified patent and that said Letters Patent is hereby corrected as shown below:

On the Title Page, item (75), under "Inventors", in Column 1, Line 1, delete "Linkoping" and insert -- Linköping --, therefor.

In the Specification

In Column 1, Line 43, delete "(RSRQ)" and insert -- (RSCQ) --, therefor.

In Column 10, Line 16, delete "$y=W^H x$" and insert -- $y=W^H x.$ --, therefor.

In Column 10, Line 19, delete "$W=(HH^H+R_i)^{-1}H$" and insert -- $W=(HH^H+R_i)^{-1}H,$ --, therefor.

Signed and Sealed this
Twenty-eighth Day of July, 2015

Michelle K. Lee
*Director of the United States Patent and Trademark Office*